July 10, 1923.
L. BLACKMORE
FARM TRACTOR
Filed July 2, 1920
1,461,716
2 Sheets-Sheet 1
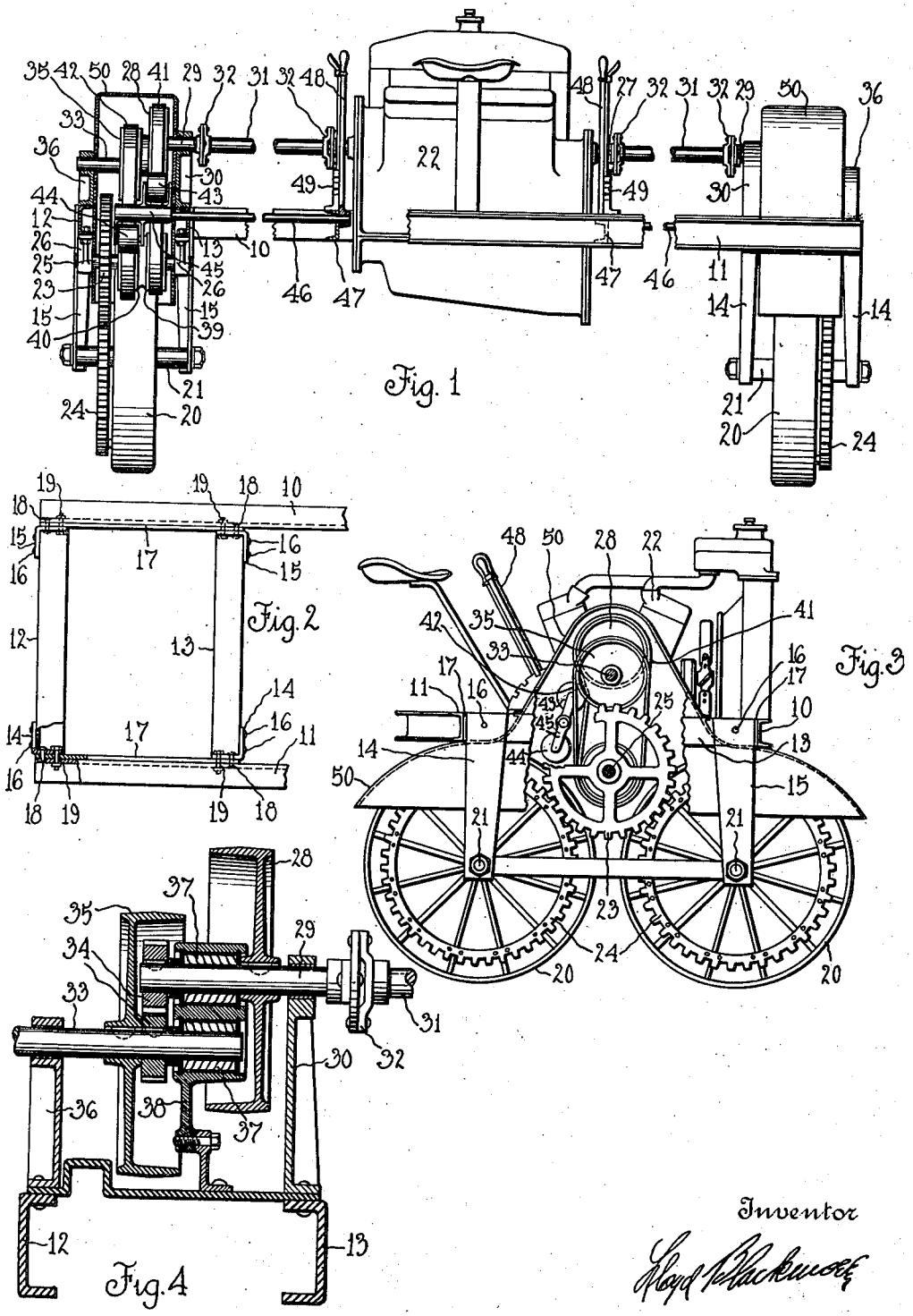

July 10, 1923.
L. BLACKMORE
FARM TRACTOR
Filed July 2, 1920
1,461,716
2 Sheets-Sheet 2
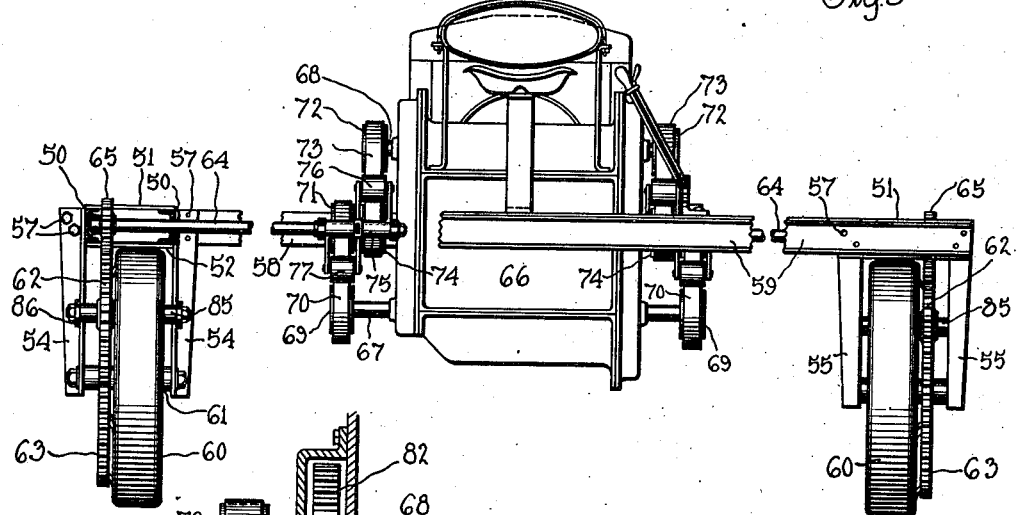
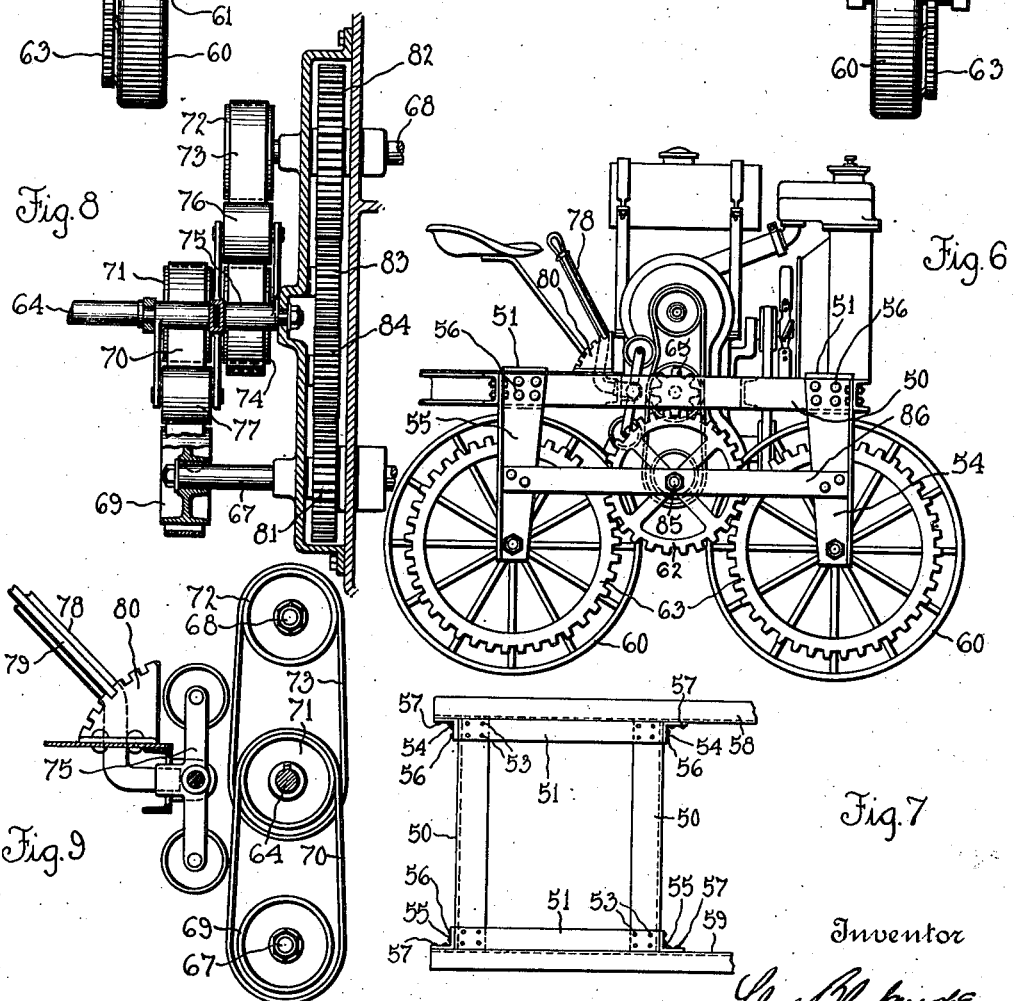
Inventor
Lloyd Blackmore Patented July 10, 1923.

1,461,716

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

FARM TRACTOR.

Application filed July 2, 1920. Serial No. 393,612.

*To all whom it may concern:*

Be it known that I, LLOYD BLACKMORE, a subject of the King of Great Britain, and a resident of Highland Park, county of Wayne, and State of Michigan, have invented certain new and useful Improvements in Farm Tractors, of which the following is a full, clear, concise, and exact description, such as will enable others skilled in the art to which the invention relates to make and use the same, reference being made therein to the accompanying drawings, which form a part of this specification.

My invention relates to tractors driven by internal combustion engines and designed especially for hauling agricultural implements, altho the same may be used for general hauling purposes, and particularly to farm tractors of the type or class which are considerably wider than they are long in a fore and aft direction and in which the driving wheels upon each side of the tractor are driven independently of those upon the other side, to thereby effect the steering of the tractor.

The principal object of my invention is to provide an improved farm tractor of the general type or class above referred to and wherein the driving wheels upon each side thereof are carried by a separate and independent supporting device or frame and remain permanently assembled relative thereto to thereby provide a unitary driving device, so that two such unitary driving devices may be attached to frame members of different lengths from which the main frame of a tractor is formed; thereby providing for the building up, as it were, of tractors of different widths and for different purposes by using standard and previously assembled unitary driving devices in connection with frame members of different lengths for forming the main frame of the tractor.

A further object of my invention is to provide an improved tractor of the general type or class above referred to and in which an engine of the V-class or type is used for propelling the same, the arrangement of the engine being such that its crank and valve shafts extend transverse to the direction of movement of the tractor.

A further object of my invention is to provide an improved farm tractor of the general class or type referred to and in which improved transmission mechanism is present for driving the driving wheels on each side of the tractor independent of those upon the other side, and either in a forward or in a reverse direction, as regards the wheels upon each side of the tractor.

With the above and other objects of invention in view my invention consists in the improved farm tractor and subordinate parts and auxiliary features thereof illustrated in the accompanying drawings and hereinafter described and claimed; and in such variations and modifications thereof, within the scope of the concluding claims, as will be obvious to those skilled in the art to which my invention relates.

Referring now to the drawings wherein the preferred embodiment of my invention is illustrated:

Figure 1 is a view showing one form of my improved farm tractor in end elevation, certain portions thereof being broken away to enable the construction thereof to be better understood.

Figure 2 is a fragmentary view showing one end of the tractor in plan the guard or casing for enclosing the transmission mechanism being omitted to better show features of frame construction.

Figure 3 is a view showing the tractor shown in Figure 1 in side elevation, and as seen from a position at the right hand side thereof.

Figure 4 is a view showing two reversely rotating driving pulleys of the transmission mechanism of the tractor upon a larger scale.

Figure 5 is a view similar to Figure 1 but showing my improved tractor modified as to various of the features thereof.

Figure 6 is a view showing the tractor shown in Figure 5 from end elevation, and as seen in a position at the right hand side thereof.

Figure 7 is a fragmentary view showing the end of the frame of the tractor shown in Figures 5 and 6 in plan.

Figure 8 is a view showing a portion of the belt transmission mechanism and the gearing whereby the same is driven which gearing forms also the reduction gearing for the valve shaft of the engine, the view being in end elevation.

Figure 9 is a fragmentary view showing the belt transmission mechanism shown in Figure 8 in side elevation, In the drawings, and referring first to the form of my invention shown in Figures 1 to 4 inclusive, the reference numerals 10, 11 designate the front and rear frame members which, in connection with suitable cross members, form the main supporting frame of the tractor whereby the engine thereof is supported and whereby all the parts which form the same are held in proper operating relation with one another; said frame members being ordinarily of channel shape in cross section, altho their particular form is of secondary importance so far as concerns the invention to which this application relates.

The main supporting frame above referred to is itself supported and the tractor driven by means of two unitary driving devices, one located at each side of the tractor or, as otherwise expressed, at each end of the main frame thereof; these unitary driving devices being separate structures which may be built up and assembled independent of the main frame of the machine, and then secured to the main frame as unitary structures, thus providing a scheme whereby tractors of different widths and for different purposes may be built up from standard and previously assembled unitary driving devices by using frame members of different length.

In the embodiment of my invention illustrated in Figures 1 to 4 each unitary driving device above referred to comprises a top frame made up of two substantially parallel channel bars 12, 13 having two pairs of depending legs 14, 14 and 15, 15, see Figure 2, said legs being made from bar iron right angular in cross section, as shown; the upper ends of said legs being secured to the channel bars 12, 13 by rivets or equivalent fastening devices at 16 extending through one of the flanges of the legs and through the vertical webs of said channel bars. The other sides or flanges of the angle iron legs are secured to two vertically disposed plates 17 as by means of rivets or equivalent fastening members 18; and bolts, rivets or equivalent holding members 19 are provided which extend through the second mentioned flange of the legs, through the said plates 17 and through the webs of the frame members 10, 11, to thereby secure the unitary driving devices as a whole and the main frame together. It will be appreciated, however, that the members 12, 13 and the plates 17 are secured together by the rivets 16, 18 passing through the flanges and the legs as above explained, thus providing a unitary rigid and substantially horizontal supplemental top frame with depending legs, which may be detachably secured to the main frame members as a single structure in assembling the complete tractor.

Each unitary driving device the supporting frame work of which is made up as above described has as a part thereof two driving wheels 20, 20 permanently assembled therewith, said wheels being arranged in tandem and the same being rotatably supported one between the lower ends of each pair of legs 14—14, 15—15 by means of shafts or axles 21. These driving wheels are shown as driven in unison from the engine 22 of the tractor through driving gears 23, 23 which gears are driven through the transmission mechanisms to be hereinafter described; and which driving gears are in mesh with two large annular racks or gears 24, 24 secured one to each of the driving wheels 20. The driving gears 23, 23 are carried by shafts 25 referred to hereinafter as driven shafts and which shafts are supported in brackets 26, 26 depending from the channel bars 12, 13 of the supplemental frame; so that said driving mechanisms are in fact a part of the unitary driving devices. Other forms of driving mechanism for driving the driving wheels from the transmission mechanism of the tractor may, however, be employed, without departing from my invention, as the same regarded in its broader aspects is not concerned with the particular manner in which the wheels of the tractor are driven from a driven shaft such as the shaft 25.

The engine 22 which drives the tractor is commonly of the multiple cylinder type and the arrangement thereof is such that the crank shaft extends longitudinally of the main frame of the tractor and transverse to the direction of movement thereof, the engine shown being of the V type altho my invention is not limited to use with an engine of that particular type or class.

The valve operating or cam shaft 27 of the engine, which obviously extends transverse to the direction of travel of the tractor, is the shaft through which power is communicated to the driving wheels 20 of the unitary driving devices upon the two sides of the tractor; the said shaft being operatively connected with two forward driving belt pulleys 28, 28 carried by short shafts 29, 29 which are rotatable in bearings at the upper ends of supporting brackets 30, 30 carried by the channel bars 13, through two driving shafts 31, 31; suitable flexible, ball or equivalent universal joints being provided at 32 to prevent binding of the parts, as will be appreciated.

The short shafts 29, 29 are operatively connected with other shafts 33, 33 through intermeshing spur gears 34 the effect of which is to drive the shafts 33 in a direction opposite to that in which the shafts 29 are driven, and said shafts 33 support and drive two reverse driving belt pulleys 35 which, as will be appreciated, are caused to rotate in a direction opposite to the direction of rotation of the direct or forward driving pulleys 28 through the driving pinions 34 above referred to. The outer ends of the shafts 33 are supported in bearings 36 carried by the supplemental top frame of the unitary supporting devices; and the inner ends of the shafts 29, 33 adjacent the gears 34 are supported in roller bearings 37, which in turn are carried by brackets 38 which are also supported by the top frames of the said unitary driving devices, as best shown in Figure 4.

Secured to the driven shaft 25 and rotating therewith are two belt pulleys 39, 40 spaced apart from one another; and the reference numerals 41, 41 designate forward driving belts extending about the pulleys 28, 39 while the reference numerals 42, 42 designate reverse driving belts extending about the pulleys 35, 40 above referred to, the length of the belts being such that both are normally loose upon the pulleys about which they extend; such a pair of belts and such pairs of pulleys being present at each side of the tractor, as will be understood.

Co-operating with the pairs of forward and reverse driving belts 41 and 42 are two belt tightening devices one at each side of the tractor, and which devices are shown as comprising in each case two idler pulleys 43, 44 carried by oscillating yokes 45, 45, which yokes are secured to the outer ends of oscillating shafts 46 the outer ends of which are supported in bearings carried by the channel bars 13; while the inner ends of said shafts are supported in cross channel bar frame members 47, 47 of the main frame of the tractor. Secured to the inner ends of the oscillating shafts 46 are levers 48, 48 which levers may be locked in any of the positions in which they are placed by means of latches which enter notches provided in segmental holding members 49 located adjacent the inner end of the belt tightener operating shafts 46.

In view of the foregoing it will be appreciated that when either of the levers 48 is moved forward the idler pulley 43 of the belt tightening device operated by the said lever will be moved into engagement with the forward driving belt 41, thereby tightening the same and securing the driving of the pulley 39 and of the driven or power shaft 25 from the driving pulley 28 through the said belt, thus transmitting motion to the driving wheels 20 and driving the tractor in a forward direction; the reversing belt 42 running loose and the same being supported by the reverse pulley 35 but not acting to drive the pulley 40.

On the other hand, if one of the levers 48 be moved in a rearward direction the idler pulley 44 will be moved into engagement with the rear driving belt 42, thus tightening the same upon the pulleys 35 and 40 and securing the driving of the tractor in a rearward direction; the forward driving belt 41 hanging loose upon the pulley 28 and the same being out of contact with the forward driving pulley 39 at such times.

It will be appreciated that the driving mechanism above described in detail is duplicated upon each side of the tractor, so that the driving wheels associated with each of the unitary driving devices may be driven in a direction to secure forward driving of the tractor upon both sides thereof; or the driving wheels of one of the said unitary driving devices may be driven in such a way as to drive one side of the tractor forward, and those of the other unitary driving device in a manner to drive the other side of the tractor rearward, thus providing for the turning of the tractor within an extremely small space. Furthermore, the driving wheels of either unitary driving device or upon either side of the tractor may be driven slower than those upon the other side by permitting the driving belt upon the side in question to slip, thus providing for the steering of the tractor by driving the driving wheels upon one side thereof slower than the other; and such steering, it will be appreciated, may be accomplished irrespective of the direction in which the tractor is driven, for either the forward or the reverse driving belt upon either side of the tractor may be permitted to slip to accomplish the steering of the same.

The transmission and reversing mechanism as well as the driving mechanism through which the driving wheels of each of the unitary driving devices and upon each side of the tractor are driven from the driving shafts 31 are preferably enclosed in suitable casings 50, 50 to thereby prevent access of dust to the mechanism in question and prevent the operator of the tractor or others from being injured by coming in contact with the mechanism in question; and the driving of the said driving shafts from the cam shaft 27 of the engine, which rotates at half the speed of the crank shaft, thereof, provides transmission and driving mechanism wherein half the speed reduction between the engine and the driving wheels is secured by making use of an element of the engine itself, thus greatly simplifying the speed reduction gear trains or mechanisms through which the driving wheels of the tractor are driven.

In the embodiment of my invention illustrated in Figures 5 to 9 inclusive the supplemental top frames of the two unitary driving devices upon opposite sides of the tractor are made up of parallel channel bars 50, 50 the ends of which are secured together by upper and lower plates 51, 51 and 52, 52, and rivets 53 passing through the said plates and through the upper and lower flanges of the channel bars 50, to thereby provide a rigid structure. Two pairs of oppositely located legs 54, 54 and 55, 55 are rigidly secured at their upper ends to the top frame and extend downward therefrom, said legs being right-angular in cross section as in the form of my invention hereinbefore described and one of the side flanges thereof being secured to the vertically extending webs of the channel bars 50 by rivets or equivalent fastening members 56. The other flanges of the legs are secured by means of rivets, bolts or other fastening device 57 to the longitudinally extending front and rear side members 58, 59 of the main frame of the tractor, thus providing a plan whereby tractors of different widths, and for different services, may be built up from standard and previously assembled unitary driving devices by securing two such devices one to each end of the frame members of the main frame of the tractor; the said unitary driving devices being assembled as unitary mechanisms as above explained and as such being capable of attachment to the main frame of the tractor as single units.

The driving wheels 60 in the embodiment of my invention here referred to are arranged in tandem, and located one between the lower ends of each pair of legs 54, 54 and 55, 55; said wheels being rotatable upon axles 61 extending between the lower ends of said pairs of legs and the same being driven by driving gears 62, 62 suitably supported upon shafts 85, 85 the ends of which are supported by bars 86 the ends of which are in turn supported from the pairs of depending legs. The gears 62, 62 are in mesh with annular racks or gears 63, 63, one secured to and rotating with each of the driving wheels the same as in the form of my invention hereinbefore described, altho the particular driving mechanism through which the driving wheels are driven is a matter of secondary importance in so far as concerns this present invention, and may be varied without departing therefrom.

The reference numerals 64, 64 designate two driving shafts extending each way from the engine, the same being supported in suitable bearings carried by cross members of the main frame of the tractor and each of said shafts being provided with a driving pinion 65 secured upon the outer end thereof, which driving pinions are in mesh with the gears 62, 62 above referred to to thereby drive the driving wheels upon each side of the tractor.

The engine 66 is supported from the main frame of the tractor and the arrangement thereof is the same as that hereinbefore described, that is the crank shaft 67 and the vavle operating or cam shaft 68 thereof are parallel with one another, and extend transverse to the direction of travel of the tractor. The crank shaft 67 of the engine is provided with forward driving pulleys 69, 69 secured one to each end thereof; and the reference numerals 70, 70 designate two driving belts extending about the said forward driving pulley and about pulleys 71 secured to and acting to drive the driving shafts 64, 64, said belts being normally loose.

The cam shaft 68 of the engine is provided with two rearward driving pulleys 72, 72 secured one to each end thereof; and the reference numerals 73, 73 designate reverse or rearward driving belts which extend about the said pulleys 72 and about pulleys 74 also secured to and acting to drive the driving shaft 64, 64, said belts being also normally loose, all as will be understood from Figure 9 of the drawing.

The reference numerals 75, 75 designate oscillating belt tightener yokes, the same having two pairs of oppositely extending arms between the ends of which two belt tightening idler pulleys 76, 77 are supported; the former of said pulleys being adapted to co-operate with and tighten the belts 73 to thereby secure rearward driving of the tractor through the pulleys 72, belts 73, pulleys 74 and the driving shafts 64; while the latter of said belt tightening pulleys is adapted to tighten the belts 70 to thereby secure forward driving of the tractor through the pulleys 69, the belts 70, the pulleys 71 and the said driving shafts. It will be appreciated, however, that either of the engine shafts 67, 68 may be utilized for forward driving, and the other for reverse driving, according to the choice of the designer in each particular case and the service for which the tractor is required. The belt tightening yokes 75, 75 are operated by levers 78, 78; said levers being each provided with latch devices 79 which, in connection with suitable notched plates 80, provide means for holding the belt tightening devices in whatever position they may be placed in.

The shafts 67 and 68 are driven in a two to one ratio as is usual in internal combustion engines operating upon a four stroke cycle and, inasmuch as one of these shafts is used for forward driving and the other for reverse driving, it follows that the said shafts must be driven in opposite directions. This driving of the shafts in question in opposite directions and at a two to one speed ratio may be accomplished by various forms of transmission gearing or gear trains, the form thereof illustrated in Figure 8 comprising the usual spur gears 81, 82 one twice the diameter of the other, together with intermediate idler gears 83, 84 in mesh with one another and with the gears above referred to, to thereby transmit motion from the gear 81 to the gear 82 at a two to one speed ratio and to also reverse the direction of rotation of said gears relative to one another.

It will be appreciated that by properly manipulating the belt tightening levers 78, 78 the driving wheels upon both sides of the tractor may be driven in either a forward or in a reverse direction, thus securing forward or rear driving for the tractor as a whole, or the driving wheels upon one side may be permitted to lag behind those upon the other side to thereby accomplish the steering of the tractor, the same as in the form of my invention hereinbefore explained; and it is further obvious that in both forms of my invention the driving engine may be entirely disconnected from the driving wheels and the tractor permitted to remain at rest by placing the levers which control the respective belt tightening devices in their neutral central positions, under which conditions all the driving belts will run loose upon the pulleys with which they co-operate and no motion will be communicated to the driving wheels of the tractor.

Having thus described and explained my invention, I claim and desire to secure by Letters Patent:

1. In a tractor of the class described and in combination with a main supporting frame, two unitary driving devices one located upon each side of the tractor and at each end of said main frame and each of which devices comprises a supplemental top frame, and two pairs of depending legs the upper ends of which are fixedly secured to said top frame and which legs are arranged one pair in front of the other; two driving wheels associated with each of said driving devices and which wheels are arranged in tandem and are rotatably supported one between the lower ends of each pair of legs; means whereby said top frames may be secured one to each end of said main frame; an engine carried by said main frame and adapted to drive the tractor; two driving shafts driven by said engine and through which the driving wheels upon opposite sides of the tractor are driven from said engine; two oppositely rotating pulleys located above each of said supplemental top frames and which pulleys are driven from the driving shafts aforesaid; two driven shafts one supported by each of the top frames aforesaid, and each of which shafts is provided with two driven pulleys; two normally loose belts associated with each of said driving devices and which belts pass about the oppositely rotating pulleys aforesaid and about the pulleys upon the driven shaft associated with each driving device; and two belt tightening devices, one associated with the two belts through which the driving wheels upon each side of the tractor are driven and whereby one or the other of said belts may be tightened, to thereby drive the driving wheels with which they are associated.

2. In a tractor of the class described, a unitary driving device comprising a supplemental top frame, and two pairs of depending legs the upper ends of which are rigidly secured to said supplemental frame and which legs are arranged one pair in front of the other; two driving wheels carried by said driving device and which wheels are arranged in tandem, and are rotatably supported one between the lower ends of each pair of legs; means whereby said supplemental frame may be secured to the main frame of a tractor; two oppositely rotating driving pulleys carried by said supplemental frame; a driven shaft carried by said supplemental frame and operatively connected with said driving wheels to drive the same, and which driven shaft is provided with two pulleys; two normally loose belts passing about said pairs of driving and driven pulleys and either of which may drive said driven shaft; and a belt tightening device adapted to tighten either of the belts aforesaid to thereby secure the driving of said driven shaft in either a forward or in a reverse direction.

3. In a tractor of the class described, an engine having a valve operating shaft extending transverse to the direction of movement of the tractor; two driving shafts arranged in line with said valve operating shaft and through which the tractor is driven; driving wheels located upon opposite sides of the tractor; and two transmission mechanisms intermediate said driving shafts and said driving wheels and through which the wheels upon each side of the tractor may be driven independently of those upon the other side; each transmission mechanism comprising two oppositely rotating pulleys driven from one of said driving shafts, a driven shaft operatively connected with the wheels upon the side of the tractor in question, two pulleys fast upon said driven shaft, two normally loose belts passing about said oppositely rotating pulleys and the pulleys upon said driven shaft, and belt tightening means for tightening one or the other of said belts; and a suitable frame whereby said parts are supported in proper operative relation with one another.

4. In a tractor of the class described, an engine having a valve operating shaft extending transverse to the direction of movement of the tractor; two driven shafts driven by said valve operating shaft and through which the tractor is driven; driving wheels located upon opposite sides of the tractor; and two transmission mechanisms intermediate said driving shafts and said driving wheels and through which the wheels upon each side of the tractor may be driven independently of those upon the other side; each transmission mechanism comprising a pulley secured to the end of a driving shaft, a second pulley, gearing through which said second pulley is driven by and in a direction opposite to that of said first pulley, a driven shaft operatively connected with the wheels upon the side of the tractor in question, two pulleys fast upon said driven shaft, two normally loose belts passing about said oppositely rotating pulleys and about the pulleys upon said driven shaft, and a belt tightening device associated with the belts aforesaid and adapted to tighten one or the other of them; and a suitable frame whereby said parts are supported in proper operative relation with one another.

5. In a tractor of the class described and in combination with a main supporting frame, two unitary driving devices one located upon each side of the tractor and at each end of said main frame and each of which devices comprises a supplemental frame, two driving wheels arranged in tandem and rotatably supported by but otherwise immovable relative to said supplemental frame, and means whereby said supplemental frames may be secured one to each end of said main frame; an engine carried by said main frame and adapted to drive the tractor; two driving shafts extending from said engine and terminating adjacent said supplemental frames; and two transmission mechanisms, one adjacent the end of each of said driving shafts, and which transmission mechanisms are carried by and located over said supplemental frames and through which mechanisms the driving wheels carried by said frames are driven from said driving shafts.

6. In a tractor of the class described, an engine having a valve operating shaft extending transverse to the direction of movement of the tractor; two driving shafts driven by said valve operating shaft and through which the tractor is driven; driving wheels located upon opposite sides of the tractor; transmission mechanisms intermediate the outer ends of said driving shafts and said driving wheels and through which mechanisms the driving wheels upon each side of the tractor may be driven independent of those upon the other side thereof; controlling means associated with each of said transmission mechanism; and a suitable frame whereby said parts are supported in proper operative relation with one another.

7. In a tractor of the class described, an engine having a shaft extending transverse to the direction of movement of the tractor; two driving shafts driven by said first mentioned shaft and through which driving wheels upon opposite sides of the tractor are driven; two normally loose belts one associated with each of said driving shafts and through which belts said shafts may be driven from the engine, to thereby drive the driving wheels upon each side of the tractor independent of those upon the other side; two belt tightening devices, one associated with each of said belts and whereby said belts may be tightened to secure the driving of said driving shafts as aforesaid; and a suitable frame whereby said parts are supported in proper operative relation with one another.

8. In a tractor of the class described, a unitary driving device comprising a top frame, and two pairs of depending legs the upper ends of which are fixedly secured to said top frame and which legs are arranged one pair in front of the other; two driving wheels carried by said driving device and which wheels are arranged in tandem, and are rotatably supported one between the lower ends of each pair of legs; means whereby said top frame may be secured to the main frame of a tractor; and transmission mechanism carried by said top frame and operatively connected with said driving wheels to thereby communicate motion thereto.

9. In a tractor of the class described and in combination with a main supporting frame, two unitary driving devices one located upon each side of the tractor and at each end of said main frame and each of which devices comprises a supplemental top frame, and two pairs of depending legs the upper ends of which are fixedly secured to said supplemental frame and which legs are arranged one pair in front of the other; two driving wheels associated with each of said driving devices and which wheels are arranged in tandem and are rotatably supported one between the lower ends of each pair of legs; means whereby said supplemental frames may be secured one to each end of said main frame; an engine carried by said main frame and adapted to drive the tractor; and power transmission mechanism through which the driving wheels of said driving devices are driven from said engine.

10. In a tractor of the class described and in combination with a main supporting frame, two unitary driving devices one located upon each side of the tractor and at each end of said main frame and each of which devices comprises a supplemental frame, and two driving wheels arranged in tandem and which wheels are rotatably supported by but are otherwise immovable relative to said supplemental frame; means whereby said supplemental frames may be rigidly secured one to each end of said main frame; an engine carried by said main frame and adapted to drive the tractor; and power transmission mechanism through which the driving wheels of said driving devices are driven from said engine.

11. In a tractor of the class described, a unitary driving device comprising a top frame, and two pairs of depending legs the upper ends of which are fixedly secured to said top frame, and which legs are arranged one pair in front of the other; two driving wheels associated with said driving device and which wheels are arranged in tandem, and are rotatably supported one between the lower ends of each pair of legs; means whereby said driving device may be secured to the main frame of a tractor; transmission mechanism located over said top frame; and controlling mechanism also located over said top frame and whereby the driving of said driving wheels may be controlled.

12. In a tractor of the class described, a unitary driving device comprising a frame, and two driving wheels arranged in tandem and rotatably supported by but otherwise immovable relative to said frame; means whereby said frame may be rigidly secured to the main frame of the tractor; transmission mechanism carried by said frame; and controlling mechanism carried by said frame and adapted to control the driving of said driving wheels through said transmission mechanism.

13. In a device of the class described, a frame, a motor carried by said frame, a cam shaft for said motor, traction elements supporting said frame, and transmission mechanism operated by said cam shaft for driving said traction elements, substantially as shown and described.

14. In a device of the class described, a frame; a motor carried by said frame; a cam shaft for said motor; traction elements supported by said frame; and frictional driving mechanism operated by said cam shaft and through which said traction elements are driven.

15. In a tractor of the class described, and in combination with a main supporting frame, two unitary driving devices one located upon each side of the tractor and at each end of said main frame and each of which devices comprises a supplemental frame and a driving wheel; means whereby said supplemental frames may be rigidly secured one to each end of said main frame; an engine carried by said main frame and adapted to drive the tractor; and two power transmission mechanisms carried one by each of said supplemental frames and through which the driving wheels of said driving device are driven from said engine.

16. In a tractor of the class described, an engine having a valve operating shaft; two driving shafts driven by said valve operating shaft and through which the tractor is driven; driving wheels located upon opposite sides of the tractor; transmission mechanisms intermediate the outer ends of said driving shafts and said driving wheels and through which mechanisms the driving wheels upon each side of the tractor may be driven; and a suitable frame whereby said parts are supported in proper operative relation with one another.

17. In a tractor of the class described, a suitable frame; an engine supported by said frame and having a valve operating shaft extending transverse to the direction of movement of the tractor; two driving shafts arranged in line with said valve operating shaft and through which the tractor is driven; driving wheels located upon opposite sides of the tractor; and two transmission mechanisms intermediate said driving shafts and said driving wheels and through which the wheels upon each side of the tractor may be driven independently of those on the other side.

18. In a tractor of the class described, a main frame, a unitary driving device complete in itself and the parts of which are assembled in fixed positions relative to one another detachably connected to each side of said main frame, each of said devices including a supplemental frame and traction means secured to said supplemental frame, said devices being so constructed and arranged that they are interchangeable.

In testimony whereof I affix my signature.

LLOYD BLACKMORE.